United States Patent [19]

L'Hostis et al.

[11] Patent Number: 5,486,306
[45] Date of Patent: Jan. 23, 1996

[54] FOAM CONTROL AGENTS

[75] Inventors: Jacqueline L'Hostis, Woluwe-Saint-Lambert; Franck A. D. Renauld, Gistoux; George C. Sawicki, Rixensart, all of Belgium

[73] Assignee: Dow Corning, S.A., Seneffe, Belgium

[21] Appl. No.: 81,873

[22] Filed: Jun. 25, 1993

[30] Foreign Application Priority Data

Jul. 9, 1992 [GB] United Kingdom ............... 9214567

[51] Int. Cl.⁶ .................. B01D 19/04; C11D 3/00
[52] U.S. Cl. .............. 252/174.15; 252/321; 252/358
[58] Field of Search ................ 252/174.15, 321, 252/358

[56] References Cited

U.S. PATENT DOCUMENTS

| | | | |
|---|---|---|---|
| 3,756,052 | 9/1973 | Quaai et al. | 72/42 |
| 3,984,347 | 10/1976 | Keil | 252/321 |
| 4,486,336 | 12/1984 | Pape et al. | 252/321 |
| 4,514,319 | 4/1985 | Kulkarni et al. | 252/321 |
| 4,639,489 | 1/1987 | Aizawa et al. | 252/321 |
| 4,690,688 | 9/1987 | Adams et al. | 44/76 |
| 4,690,713 | 9/1987 | Terae | 106/287.16 |
| 4,732,694 | 3/1988 | Gowlard et al. | 252/171.21 |
| 5,017,221 | 5/1991 | Legrow et al. | 106/2 |
| 5,045,225 | 9/1991 | Aronson et al. | 252/174 |
| 5,106,535 | 4/1992 | Mutoh | 252/358 |
| 5,262,088 | 11/1993 | Hill et al. | 252/174.15 |

FOREIGN PATENT DOCUMENTS

| | | |
|---|---|---|
| 0217501 | 4/1987 | European Pat. Off. |
| 427263 | 5/1991 | European Pat. Off. |
| 60-106507 | 6/1985 | Japan |
| 54-149388 | 6/1985 | Japan |

Primary Examiner—E. Rollins Cross
Assistant Examiner—E. D. Irzinski
Attorney, Agent, or Firm—Timothy J. Troy

[57] ABSTRACT

A foam control agent which is free from hydrocarbon oils and comprises (A) an organopolysiloxane with 0 to 60% of units (i)

$$R_a SiO_{\frac{4-a}{2}}$$

wherein R denotes a $C_8$ hydrocarbon group and a is 0–3, and 40 to 100% of units (ii)

$$R_b R_c'' SiO_{\frac{4-b-c}{2}}$$

wherein R" is —$Z_z$—R' with R' being an $C_{9-35}$ alkyl, Z is a linking group and z is 0 or 1, b 0, 1 or 2, c 1 or 2 and b+c 1, 2 or 3, provided more than 70% by weight of the carbon content of (A) is due to R", (B) a finely divided hydrophobic particulate material and (C) optionally a MQ organosilicon resin. The agents give improved performance and stability e.g. in detergent powders.

20 Claims, No Drawings

FOAM CONTROL AGENTS

The present invention relates to foam control agents. More specifically the present invention relates to foam control agents which are based on organopolysiloxanes having higher alkyl groups substituted on some of the silicon atoms.

Foam control agents which are based on organopolysiloxanes have been known for a long time, and have found applications in a large number of industries, e.g. detergent industry, textile industry and paper industry. A large number of organopolysiloxane based foam control agents use polydimethylsiloxanes which are end-blocked by trimethylsilyl groups. Much research has gone into improving such foam control agents with varying measures of success. There is a continuing need to find more effective and robust foam control agents.

Certain types of hydrocarbonsilicone copolymers have been suggested in U.S. Pat. No. 4,514,319 for the improvement of the antifoaming ability of compositions based on hydrocarbon oils as the antifoam vehicle, particularly mineral oil. In said specification there is disclosed a hydrocarbon oil based silicone antifoam composition which comprises from 1 to 60 weight percent of a hydrocarbonsilicone copolymer, from 1 to 20 weight percent of a hydrophobic filler having a certain average particle size, from 20 to 97 weight percent of a hydrocarbon carrier oil and optionally an organosilicone surfactant and a silicone oil. The hydrocarbonsilicone copolymer may be a random copolymer or a block copolymer, but has to fulfil the condition that the %$CH_2$ content is in the range of about 30% to about 70%. This condition has to be fulfilled in order to ensure that the hydrocarbonsilicone is soluble in the hydrocarbon carrier oil and that there is sufficient surface activity at the oil/air interface to decrease the surface tension at low concentrations, and thus spread on a surfactant solution, e.g. on 0.5% aqueous solution of sodium dodecyl sulphate. This $CH_2$% is not clearly defined in the specification, but from the examples can be read as meaning the number percentage of $CH_2$ groups which are present in the larger hydrocarbon substituents based on the total number of carbon atoms present in the copolymer. Hydrocarbonsilicone copolymers with a %$CH_2$ which is lower than 30% or higher than 70% have been disclosed, but do not improve the performance of the hydrocarbon oil based antiantifoam. There is no indication that similar hydrocarbonsilicone copolymers could be useful as foam control agent without the presence of a hydrocarbon oil.

A different type of siloxane has been suggested in E.P. Specification 397 297 for use in combination with hydrocarbon oils and finely divided filler particles. The siloxane materials are alkylaminosilicones wherein at least one silicon atom is substituted with an amino containing group which has a $C_{6-50}$ hydrocarbon radical linked directly to a nitrogen atom. These materials are stated only to be useful if similar conditions are fulfilled to those required of the hydrocarbon silicon copolymers of U.S. Pat. No. 4,514,319. This means that the alkylaminosilicones have to be soluble in hydrocarbon oils and still possess excellent surface activity. These conditions are stated to be fulfilled if the alkylaminosilicones have a methylene content of at least 1% by weight, preferably 5 to 10%, and if they exert a surface tension lowering on the hydrocarbon oils of at least 5 dynes/cm. The test applied in said patent specification if the $CH_2$ content (calculated as number of methylene groups over the sum of methylene groups and methyl groups×100) is from 45 to 90% most preferably from 50 to 75%, and if the resulting mixture of the silicone with mineral oil spreads over a 0.5% by weight solution of sodium dodecylsulphate in water.

We have now found that foam control agents can be improved by leaving out hydrocarbon oils and using as the organopolysiloxane an organopolysiloxane which has a certain amount of higher alkyl groups linked directly or indirectly to silicon atoms. This is surprising, as these organopolysiloxane materials do not spread on an aqueous solution of 0.5% by weight sodium dodecylsulphate and are therefore traditionally regarded as unsuitable for antifoaming purposes.

According to a first aspect of the invention there is provided a foam control agent, which is free from hydrocarbon oils, and comprises (A) from 70 to 99.9 parts by weight of an organopolysiloxane of which the siloxane units consist essentially for 0 to 60% of units of the general formula (i)

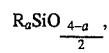

wherein R denotes a hydrocarbon group having up to 8 carbon atoms and a has a value of from 0 to 3, and for 40 to 100% of units of the general formula (ii)

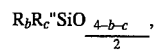

wherein R" denotes a group —$Z_z$—R', wherein R' denotes an alkyl group having from 9 to 35 carbon atoms, Z denotes a linking group between silicon and R' and z has a value of 0 or 1, b has a value of 0, 1 or 2, c has a value of 1 or 2, and b+c has a value of 1, 2 or 3, provided more than 70% by weight of the carbon content of the organopolysiloxane is due to the groups R", (B) from 0.1 to 30 parts by weight of a finely divided hydrophobic particulate material and (C) from 0 to 20 parts by weight of an organosilicon resin consisting essentially of triorganosiloxane groups and $SiO_{4/2}$ groups.

Some organopolysiloxanes which are useful in the present invention are known materials and have been described in a number of publications. For example U.S. Pat. No. 3,756,052 describes a metal working lubricant in which an organopolysiloxane is used which has the formula

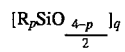

in which R is selected from monovalent hydrocarbon or halohydrocarbon groups having from 1 to 19 carbon atoms, at least 30% of the R substituents being alkyl radicals containing from 8 to 18 carbon atoms. In U.S. Pat. No. 5,017,221 there is described an emulsion which is useful as a protective coating for surfaces such as rubber, which comprises polymethylalkylsiloxane having the general formula

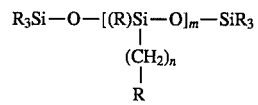

wherein R is methyl, m is an integer from 1 to 3000 and n is an integer from 1 to 10.

Polydiorganosiloxanes (A) which are useful in the composition of the present invention have at least units of the formula (ii), although they may also have some units of formula (i). Preferred organopolysiloxanes are those where from 40 to 100% of all units are units of formula (ii), more preferably 60 to 100%. It is also preferred that the value of a in formula (i) and the value of b+c in formula (ii) is 2 for the majority of units, making the organopolysiloxane (A) predominantly a polydiorganosiloxane with a linear structure.

In the preferred organopolysiloxanes the linear polymer is end-capped with units wherein a or b+c has a value of 3. It is, however, also possible that one of the substituents of the terminal silicon atoms in the preferred organopolysiloxanes is a hydroxyl group or an alkoxy group, having 1 to 6 carbon atoms., Thus preferred organopolysiloxanes are polydiorganosiloxanes with the general structure

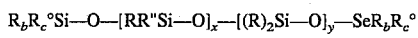

$R_b R_c°Si—O—[RR''Si—O]_x—[(R)_2Si—O]_y—SeR_b R_c°$ wherein R and R'' are as defined above, R° denotes either a group R or a group R'' b and c are as defined above and x and y each independently denote an integer. The values of x and y are not crucial in these preferred organopolysiloxanes. They may range from 0 to many hundreds, giving polymers with a viscosity which may be very low or very high, even up to many thousands of $mm^2/s$. It is required, however, that the molecule fulfils the conditions set out above with regard to the number of units having a group R''. Preferred however are those polymers where the total chain length (x+y+2) includes from about 40 to about 500 units, most preferably 60 to 400 units.

It is also required that the organopolysiloxanes have a carbon content where more than 70% by weight is due to presence of groups R''. More preferably the carbon content attributed to the groups R'' is at least 75%, most preferably from 80 to 90% by weight. This can be achieved by several means. It is possible to use R' groups which are long chain alkyl groups. Alternatively, or in conjunction, it is possible to allow a high proportion of units of formula (ii) in the siloxane polymer.

Preferred R' groups are those which have a carbon chain of from 10 to 24, more preferably 10 to 18. Examples of suitable groups R' are dodecyl, tetradecyl, octadecyl and eicosyl. The groups R denote hydrocarbon groups with up to 8 carbon atoms. These may be for example alkyl, aryl, alkenyl, alkylaryl, arylalkyl or alkynyl groups. Preferably at least 50% of all R groups are alkyl groups, more preferably at least 80%. It is particularly preferred that the R groups are methyl or ethyl groups, most preferably methyl.

Polyorganosiloxanes (A) may be prepared by any of the known methods. For example they may be formed by hydrolysing silanes which have two hydrolysable groups and one group R and one group R'' as silicon-bonded substituents. Alternatively they may be provided by reacting organopolysiloxanes which have a number of reactive groups substituted on silicon atoms with certain organic groups having higher alkyl groups. Depending on the type of group which is present on the silicon atoms, and the type of alkyl containing group with which they are reacted, the group Z may vary, and may even not be present at all. For example if an organopolysiloxane has silicon bonded hydrogen atoms which are reacted with α,β-alkenes having from 9 to 35 carbon atoms, having its olefinic unsaturation between the first 2 carbon atoms in the presence of a catalyst which promotes the addition reaction between Si—H and the unsaturation, resulting in the group R'' being equal to the group R' (z=0). Suitable catalysts for this reaction include platinum and rhodium based complexes. Suitable alkenes include 1,2-dodecene, 1,2-octadecene and 1,2-eicosene. Although this method is preferred, resulting in each R'' group being a group R', there are many other ways of linking higher alkyl groups to a siloxane polymer. These methods are well known in the art and include condensation of a silanol group with an alcoholic group, a silicon-bonded hydrogen atom with an alcoholic group or a silanol group with an ether, all resulting in Z being an oxygen link. Other reactions include silanol groups or alkoxy substituted silicon atoms with carboxylic acids or epoxides, amino functional siloxanes with epoxy functional organic groups or lactones and alkenyl functional silicone with a mercapto group. The resulting group Z may therefore be one of a number of divalent linking groups, consisting of O or C, H and optionally O, N, S or P atoms or C, H, O and optionally N, S or P atoms. Oxygen, when present, would be in the form of an ether oxygen, an ester oxygen or a substituted hydroxyl or alkoxy group. Nitrogen, when present, would be in the form of amino groups or, if present, with oxygen in the form of an amido group. Suitable examples of Z groups include alkylene ester groups, alkylene ether groups, amide groups, polyamino/amido groups and mercapto groups, for example —O—, —CH$_2$CH$_2$O—C(=O)—, —CH$_2$ CH$_2$O—CH$_2$—CH(OH)—, —(CH$_2$)$_3$NHC(=O)—, —(CH$_2$)$_3$NH—CH$_2$—C(=O)—, —CH$_2$CH$_2$S— and

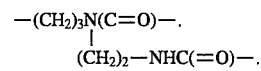

$$-(CH_2)_3N(C=O)- \\ | \\ (CH_2)_2-NHC(=O)-.$$

Component (B) is a finely divided hydrophobic particulate material. Suitable particulate materials are wellknown in the art of foam control and include e.g. silica, titania, alumina, ground quartz, magnesium oxide, zinc oxide, salts of aliphatic carboxylic acids, e.g. calcium or aluminium stearates, reaction products of isocyanates with certain materials, for example cyclohexylamine and alkyl amides, e.g. ethylene or methylene bis stearamide. Preferred are silica particles, especially those having an average particle size of from 0.1 to 50μ, preferably from 1 to 20μ and a surface area of at least 50 $m^2/g$. These silica particles can be rendered hydrophobic e.g. by treating them with dialkylsilyl groups and/or trialkylsilyl groups either bonded directly onto the silica or by means of a silicone resin. We prefer to employ a silica the particles of which have been rendered hydrophobic with dimethyl and/or trimethyl silyl groups. Suitable silica materials include fumed silica, precipitated silica, hydrothermal silica and gel formation silica. Preferably the amount of particulate material used in the foam control agent is from 1 to 20 parts by weight, more preferably 3 to 15 parts, most preferably 5 to 8 parts. A foam control agent according to the invention may contain a mixture of different particulate materials.

Component (C) is an optional ingredient in the foam control agent according to the invention. It consists essentially, and preferably only, of monofunctional groups of the formula $R_3SiO_{1/2}$ and tetrafunctional groups $SiO_{4/2}$, although minor amounts of difunctional or trifunctional siloxane groups may also be present. A small number of the silicon-bonded substituents may also be hydroxyl or alkoxy groups, but this should not exceed 3% of all silicon-bonded substituents. R is as defined above but it is preferred that the group R is a lower alkyl (i.e. $C_{1-3}$) group, most preferably methyl. The ratio of monofunctional to tetrafunctional units is preferably in the range of from ¼ to ⁴⁄₁, most preferably ½ to ²⁄₁. The presence of this ingredient tends to improve the efficiency of the foam control agent. It is accordingly preferred that Component (C) is present in an amount of from 3 to 15 parts, most preferably 5 to 10 parts by weight.

Additional optional components for the foam control agent are thickeners, e.g. polyvinyl alcohols, Al stearates, monoglycerides, triglycerides, treated silicas, petroleum jelly, paraffin waxes, microcrystalline waxes, dispersing agents, levelling agents, wetting agents, inorganic salts, viscosity regulators, preservatives, rust inhibitors, antioxidants and pH modifiers. Although the foam control agents are preferably used as the only such agent present they may also be used in combination with other foam control agents, e.g. stearate soaps.

The foam control agent may be made by simply mixing the ingredients in any order and ensuring good dispersion. Where the finely divided particulate material is already hydrophobic no further reaction is required. Where this is not the case, making the particulate material hydrophobic may be done in situ, e.g. by heating the mixture where the hydrophobing agent is added. Where an unwanted byproduct is generated, e.g. water or ammonia, as the result of e.g. condensation reactions between the agent and the particulate material these byproducts are preferably removed, e.g. by heating under reduced pressure.

A foam control agent according to the invention may be used in its pure form, in emulsified form or in a dispersed form, e.g. a self-dispersible form. The emulsion is particularly useful where the foam control agent has to be stored in an aqueous system, e.g. a liquid detergent composition. Emulsification may be done according to standard and well known methods.

Foam control compositions according to the present invention are useful in a number of different applications where foam is generated in an aqueous system. Examples are liquors of paper manufacturing systems, textile dying baths, food processing systems, cutting oils and detergent washing liquors. Foam control agents according to the present invention have been found particularly efficient with powder detergent compositions. Where traditional silicone-based foam control agents require special treatment to maintain their efficiency when stored with powder detergent compositions such as encapsulation in waxes, fatty acids or similar higher melting materials, it has been unexpectedly found that foam control agents according to the present invention retain their efficiency much better than prior art compositions when not protected by such means as encapsulation. This is particularly true for those organopolysiloxanes which have a degree of polymerisation of from 60 to 200 and where 70 to 100% of all silicon atoms have a R" group substituent. Most useful are organopolysiloxanes wherein the degree of polymerisation is 80 to 120 and the amount of silicon atoms which have an R" group is from 75 to 90%. A particularly useful organopolysiloxane has a degree of polymerisation of 80 and 80% of all silicon atoms with a R" group.

The present invention also provides in another of its aspects a detergent composition in powder form, comprising a detergent component and a foam control agent according to the invention. The foam control agent control composition according to the invention may be added to the detergent component in a proportion of from 0.02 to 25% by weight based on the total detergent composition. Preferably foam control agents are added in a proportion of from 0.05 to 5% by weight based on the total detergent composition.

Suitable detergent components comprise an active detergent, organic and inorganic builder salts and other additives and diluents. The active detergent may comprise organic detergent surfactants of the anionic, cationic, non-ionic or amphoteric type or mixtures thereof. Suitable anionic organic detergent surfactants include alkali metal soaps of higher fatty acids, alkyl aryl sulphonates, for example sodium dodecyl benzene sulphonate, long chain (fatty) alcohol sulphates, olefine sulphates and sulphonates, sulphated monoglycerides, sulphated ethers, sulphosuccinates, alkane sulphonates, phosphate esters, alkyl isothionates, sucrose esters and fluorosurfactants. Suitable cationic organic detergent surfactants include alkylamine salts, quaternary ammonium salts, sulphonium salts and phosphonium salts. Suitable non-ionic organic surfactants include condensates of ethylene oxide with a long chain (fatty) alcohol or fatty acid, for example $C_{14-15}$ alcohol, condensed with 7 moles of ethylene oxide (Dobanol 45-7), condensates of ethylene oxide with an amine or an amide, condensation products of ethylene and propylene oxides, fatty acid alkylol amides and fatty amine oxides. Suitable amphoteric organic detergent surfactants include imidazoline compounds, alkylamino-acid salts and betaines. Examples of inorganic components are phosphates and polyphosphates, silicates, such as sodium silicates, carbonates, sulphates, oxygen releasing compounds, such as sodium perborate and other bleaching agents and zeolites. Examples of organic components are anti-redeposition agents such as carboxy methyl cellulose (CMC), brighteners, chelating agents, such as ethylene diamine tetra-acetic acid (EDTA) and nitrilotriacetic acid (NTA), enzymes and bacteriostats. Materials suitable for the detergent component are well known to the person skilled in the art and are described in many text books, for example Synthetic Detergents, A. Davidsohn and B. M. Milwidsky, 6th edition, George Godwin (1978).

Foam control compositions according to the present invention may be mixed in with the other ingredients of the detergent composition in any suitable way. For example they may be mixed in mechanically or sprayed onto the powdered detergent composition.

The foam control agents according to the present invention are particularly useful in systems where there is a high degree of turbulence during operation of an aqueous surfactant solution, i.e. in environments with free surface turbulence. With the expression environment with free surface turbulence is meant an environment in which an aqueous surfactant solution undergoes agitation, be it mechanically or otherwise, which causes mixing of gas and liquid at the liquid/gas interface and entrainment of the one phase into the other. In one embodiment this agitation forces at least some of the liquid of the surfactant solution above the gas/liquid interface. This liquid then falls back onto the surface of the liquid, which may cause foam to be generated. In an alternative embodiment liquid is introduced from above the interfacial surface into the bulk. Examples of environments which are subject to free surface turbulence are front loading washing machines, jet dying systems which are not fully submerged, fountains and high speed sparging. Examples of environments where free surface turbulence does not take place include low speed sparging, top loading washing machines with a simple and slow agitation system and slow speed mixing systems, especially where higher viscosity liquids are mixed.

The invention provides, according to yet another aspect, a method of controlling the foam of an aqueous surfactant solution in an environment with free surface turbulence which comprises mixing said solution with 5×10 to 10% by weight of the surfactant solution of a foam control agent, comprising (A) from 70 to 99.9 parts by weight of a polydiorganosiloxane which consists essentially of 0 to 60% units of the general formula (i)

$$R_a SiO_{\frac{4-a}{2}},$$

wherein R denotes a hydrocarbon group having up to 8 carbon atoms and a has a value of from 0 to 3, and 40 to 100% units of the general formula (ii)

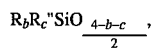

wherein R" denotes an alkyl group having from 9 to 35 carbon atoms, b has a value of 0, 1 or 2, c has a value of 1 or 2, and b+c has a value of 1, 2 or 3, provided more than 70% by weight of the carbon content of the organopolysiloxane is due to the groups R", (B) from 0.1 to 30 parts by weight of a finely divided hydrophobic particulate material and (C) from 0 to 10 parts by weight of an organosilicon resin consisting essentially of triorganosiloxane groups and $SiO_{4/2}$ groups.

The foam control agent may be mixed by addition to a surfactant composition, e.g. detergent composition, prior to this being placed in the aqueous solution, or by mixing the appropriate amount of foam control agent into the aqueous solution.

There now follow a number of examples in which all parts and percentages are by weight unless otherwise indicated.

Preparation of Foam Control Agents

Organopolysiloxanes (A) were prepared by hydrosilylation reaction of the corresponding hydrosiloxane with the corresponding alkene in the presence of a Pt catalyst. They have the general formula

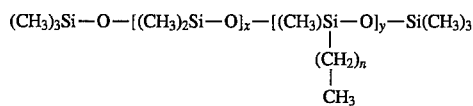

wherein the values for x, y and n are as shown in Table I.

TABLE I

| Polyorgano-siloxane | x | y | n |
|---|---|---|---|
| 1 | 0 | 59 | 9 |
| 2 | 0 | 59 | 11 |
| 3 | 0 | 59 | 13 |
| 4 | 12 | 48 | 13 |
| 5 | 12 | 48 | 17 |
| 6 | 32 | 48 | 13 |
| 7 | 32 | 48 | 15 |
| 8 | 32 | 48 | 17 |
| 9 | 60 | 40 | 13 |
| 10 | 60 | 40 | 15 |
| 11 | 60 | 40 | 17 |
| 12 | 60 | 40 | 19-23 |
| 13 | 60 | 40 | 23 |
| 14 | 80 | 48 | 14 |

Foam control agents were prepared by mixing the above organopolysiloxanes with a particulate material which was selected from (A) a precipitated silica treated with polydimethylsiloxane supplied by Degussa GmbH, (B) a fumed silica treated with dimethyl silane, also supplied by Degussa GmbH, (C) a gel-formation silica supplied by W. R. Grace Company treated in situ with trimethylsilyl groups, (D) a fumed silica treated with hexamethyldisilazane supplied by Cabot Corporation, (E) a fumed silica treated with dimethylsilane, also supplied by Cabot Corporation, (F) a untreated fumed silica supplied by Cabot Corporation, treated in situ with trimethylsilyl groups, (G) a fumed silica treated with trimethylsilane supplied by Wacker GmbH, (H) ethylene bis-stearyl-amide, (I) a hydrothermal silica supplied by Degussa GmbH, treated in situ with dimethylpolysiloxane and (J) a precipitated silica supplied by Degussa GmbH, treated in situ with dimethylpolysiloxane. In some cases an MQ resin (K) was also added. Foam Control agents AF1 to AF14 comprised 95 parts of organopolysiloxanes 1 to 14 respectively and 5 parts of Filler A. Table II shows the other foam control agents which were prepared. In brackets is given the amount of particulate material used in % by weight based on combined siloxane and particulate material weight.

TABLE II

| Foam Control Agent | Polyorgano-siloxane | Particulate Material |
|---|---|---|
| AF15 | 11 | D (2.7) |
| AF16 | 11 | D (5.4) |
| AF17 | 11 | E (2.7) |
| AF18 | 11 | G (2.7) |
| AF19 | 11 | B (2.7) |
| AF20 | 11 | F (2.7) |
| AF21 | 11 | F (5.4) |
| AF22 | 11 | C (5.0) |
| AF23 | 11 | H (8.0) |
| AF24 | 11 | A (5.0) + K (5.0) |
| AF25 | 11 | A (5.0) + K (10.0) |
| AF26 | 15 | A (5.0) + K (5.0) |
| AF27 | 1 | A (5.0) + K (5.0) |
| AF28 | 2 | A (5.0) + K (5.0) |
| AF29 | 3 | A (5.0) + K (5.0) |
| AF30 | 4 | A (5.0) + K (5.0) |
| AF31 | 6 | A (5.0) + K (5.0) |
| AF32 | 11 | I (5.0) |
| AF33 | 14 | I (5.0) |
| AF34 | 11 | J (5.0) |

Two comparative foam control agents were prepared. CAF1 was a prior art foam control agent according to the teaching of E.P. application 217 501, comprising a branched polydimethyl siloxane polymer and 5% by weight of a hydrophobic silica particulate material. CAF2 comprises a silicone polymer which has a chain length of 400 siloxane units, of which 30 have a octadecyl substituent, and 5% by weight of a hydrophobic silica. CAF3 comprises a silicone polymer which has a chain length of 100 siloxane units, of which 25 have a octadecyl substituent, and 5% by weight of a hydrophobic silica. CAF2 and CAF3 are outside the scope of the invention as respectively only 40% and 70% of their carbon content is due to the higher alkyl groups.

Testing of the Foam Control Agents in Detergent Compositions

Foam control efficiency was tested in a front loading washing machine (Miele®427) using a 3.5kg load of clean cotton pillow cases, and a washing cycle of 40° C. or of 95° C. As deter-gent composition was used about 70 g of a composition free from foam control agents of any description. They were selected from (DET1) a formulation based on alkyl benzyl sulphonate, alkyl polyethylene oxide, sodium tripolyphosphate and sodium perborate, (DET2) or (DET3) formulations supplied by a commercial detergent manufacturer based on anionic surfactants, including sodium dodecyl benzene sulphonate, nonionic surfactants including alkyl ethoxylate, perborate bleach, bleach activators, enzymes, zeolites and sequestering agents or (DET4) another formulation supplied by a commercial detergent manufacturer, based on linear anionic surfactants, including sulphonates and sulphates, nonionic surfactants, perborate bleach, bleach activators, enzymes, zeolites and sequestering agents. DET2 and DET4 are substantially more foaming than DET1 and DET3. The foam control efficiency was related to the amount of foam generated during the washing cycle and is expressed by the amount of foam control required (as a percentage by weight of the detergent composition) to keep the foam level below the 100% mark of the window of the machine, when the drum is stationary. The results are given in Table III.

TABLE III

| Foam Control Agent | Detergent Composition | Washing Cycle | Required Level |
| --- | --- | --- | --- |
| AF 1 | DET1 | 40 | 0.12 |
| AF 1 | DET1 | 95 | 0.10 |
| AF 1 | DET3 | 40 | 0.12 |
| AF 1 | DET3 | 95 | 0.10 |
| AF 3 | DET2 | 40 | 0.20 |
| AF 3 | DET2 | 95 | 0.09 |
| AF 3 | DET3 | 95 | 0.09 |
| AF 4 | DET1 | 40 | 0.18 |
| AF 4 | DET1 | 95 | 0.04 |
| AF 4 | DET2 | 95 | 0.10 |
| AF 4 | DET3 | 40 | 0.08 |
| AF 4 | DET3 | 95 | 0.10 |
| AF 5 | DET1 | 40 | 0.18 |
| AF 6 | DET1 | 40 | 0.18 |
| AF 6 | DET1 | 95 | 0.035 |
| AF 6 | DET2 | 95 | 0.10 |
| AF 6 | DET3 | 95 | 0.09 |
| AF 7 | DET1 | 40 | 0.23 |
| AF 8 | DET1 | 40 | 0.15 |
| AF 8 | DET1 | 95 | 0.037 |
| AF 8 | DET2 | 95 | 0.08 |
| AF 8 | DET3 | 95 | 0.08 |
| AF 9 | DET1 | 40 | 0.40 |
| AF 9 | DET1 | 95 | 0.10 |
| AF10 | DET1 | 40 | 0.25 |
| AF11 | DET1 | 40 | 0.13 |
| AF11 | DET1 | 95 | 0.041 |
| AF11 | DET2 | 95 | 0.13 |
| AF11 | DET3 | 95 | 0.11 |
| AF12 | DET1 | 40 | >1.0 |
| AF13 | DET1 | 40 | >1.0 |
| AF14 | DET1 | 40 | 0.18 |
| AF14 | DET1 | 95 | 0.035 |
| AF15 | DET1 | 40 | 0.20 |
| AF15 | DET1 | 95 | 0.06 |
| AF16 | DET1 | 40 | >0.3 |
| AF16 | DET1 | 95 | 0.06 |
| AF17 | DET1 | 95 | 0.095 |
| AF18 | DET1 | 40 | 0.20 |
| AF18 | DET1 | 95 | 0.10 |
| AF19 | DET1 | 40 | >0.2 |
| AF20 | DET1 | 40 | >0.3 |
| AF21 | DET1 | 40 | >0.3 |
| AF21 | DET1 | 95 | 0.095 |
| AF22 | DET1 | 40 | 0.13 |
| AF22 | DET1 | 95 | 0.050 |
| AF23 | DET1 | 40 | 0.184 |
| AF23 | DET1 | 95 | 0.08 |
| AF24 | DET1 | 40 | 0.12 |
| AF24 | DET1 | 95 | 0.03 |
| AF25 | DET1 | 40 | 0.12 |
| AF25 | DET1 | 95 | 0.03 |
| AF26 | DET1 | 40 | 0.13 |
| AF26 | DET1 | 95 | 0.03 |
| AF27 | DET2 | 95 | 0.10 |
| AF27 | DET4 | 95 | 0.40 |
| AF28 | DET4 | 95 | 0.50 |
| AF29 | DET4 | 95 | 0.50 |
| AF30 | DET4 | 95 | 0.50 |
| AF31 | DET4 | 95 | 0.40 |
| AF31 | DET4 | 95 | 0.40 |
| AF32 | DET1 | 95 | 0.04 |
| AF33 | DET1 | 95 | 0.04 |
| AF34 | DET1 | 40 | 0.06 |
| CAF1 | DET1 | 40 | 0.40 |
| CAF2 | DET1 | 40 | 0.80 |
| CAF3 | DET1 | 40 | >1.0 |

TABLE III-continued

| Foam Control Agent | Detergent Composition | Washing Cycle | Required Level |
| --- | --- | --- | --- |
| CAF3 | DET3 | 95 | >0.5 |

From Table III it is clear that the foam control agents according to the invention perform better than those materials outside the invention. AF12 and AF13 did not perform well at a 40° C. wash because the melting point of the organopolysiloxanes is higher than the washing temperature. In higher temperature applications, however, performance will be better.

Storage Stability

Foam control tests were carried out, as explained above, for detergent compositions which were stored at 40° C. for 2 or 4 weeks. The foam control agent was added to the detergent composition without any encapsulant. Test results given in Table IV show the percentage of loss in performance after storage, compared to the initial test without storage, calculated as the percentage increase required to achieve the same level of foam control.

TABLE IV

| Foam Control Agent | Detergent Composition | Storage 2 Weeks | Storage 4 Weeks |
| --- | --- | --- | --- |
| AF 4 | DET2 | 0 | 10 |
| AF 6 | DET2 | 0 | 20 |
| AF 8 | DET2 | 20 | 20 |
| AF11 | DET2 | 40 | 50 |
| AF 4 | DET3 | 0 | 0 |
| AF 6 | DET3 | 10 | 20 |
| AF 8 | DET3 | 20 | 20 |
| AF11 | DET3 | 20 | 30 |
| CAF1 | DET2 | 200 | — |

It is clear from the results that storage stability of the foam control agents is much better for detergent compositions, where the foam control agent is merely added to the powder of the detergent composition, than it is for prior art foam control agents.

Testing of Foam Control Agents in Cutting Oils

One liter of a cutting oil composition was prepared by mixing 5% of a commercially available cutting oil concentrate, Alusol® B from Castrol Corp, with soft water. The composition was placed in a 2 liter beaker which was equipped with a pumping system. The pumping system drew the composition from the beaker through a stainless steel tube and allowed the composition to drop back onto the surface of the composition within the beaker from a height of 15 cm. Before the circulation started a certain amount of foam control agent was added and the circulation was continued for 3 hours. If at the end of the three hours the foam level was less or more than 300 ml on the top of the surface of the composition, the test was repeated with amended concentrations of foam control agent, until the level after three hours had reached 300 ml exactly. The concentration of foam control agent required to reach that condition is reported in Table V below. The foam control agents used were AF3 and AF29 as defined above. Two comparative foam control agents were also tested. These were commercially available foam control agents Discotheck® from Exxon Corp. and Tensipar® from ICI Plc.

TABLE V

| Foam Control Agent | Concentration required to achieve 300 ml foam at the end of 3 hours |
| --- | --- |
| Discotheck | 0.20% |
| Tensipar | 0.19% |
| AF3 | 0.14% |
| AF29 | 0.05% |

It is clear that considerable improvement was achieved by using compositions according to the invention.

That which is claimed is:

1. A foam control agent which is free from hydrocarbon oils and comprises (A) from 70 to 99.9 parts by weight of an organopolysiloxane of which the siloxane units consist essentially of 0 to 60% of units of the general formula (i)

$$R_a SiO_{\frac{4-a}{2}}$$

wherein R denotes a hydrocarbon group having up to 8 carbon atoms and a has a value of from 0 to 3, and for 40 to 100% of units of the general formula (ii)

$$R_b R_c" SiO_{\frac{4-b-c}{2}}$$

wherein R is as defined above R" denotes a group —$Z_z$—R' wherein R' denotes an alkyl group having from 9 to 35 carbon atoms, Z denotes a linking group between silicon and R' and z has a value of 0 or 1, b has a value of 0, 1, or 2, c has a value of 1 or 2, and b+c has a value of 1, 2, or 3, provided more than 70% by weight of the carbon content of the organopolysiloxane is due to the groups R"; and (B) from 0.1 to 30 parts by weight of a finely divided hydrophobic particulate material.

2. A foam control agent according to claim 1 wherein the organopolysiloxanes are polydiorganosiloxanes with the general structure $$R_c°R_b Si—O—[RR"Si—O]_y—SiR_b R_c°$$

wherein R and R" are as defined above, R° is selected from the group R and the group R" b and c are as defined above, and x and y each independently denote an integer.

3. A foam control agent according to claim 2 wherein the total chain length (x+y+2) includes from 40 to 500 siloxane units.

4. A foam control agent according to claim 1 wherein R' groups have a carbon chain of from 10 to 24 atoms.

5. A foam control agent according to claim 1 wherein Component (B) is hydrophobic silica, having an average particle size of from 0.1 to 50µ and a surface of at least 50m²/g.

6. A foam control agent according to claim 1, wherein the foam control agent further comprises (C) from greater than zero to 20 parts by weight of an organosilicon resin consisting essentially of triorganosiloxane groups and SiO$_{4/2}$ groups.

7. A foam control agent according to claim 6 wherein Component (C) is present in an amount of from 5 to 10 parts by weight.

8. A detergent composition in powder form comprising a detergent component and a foam control agent according to claim 1.

9. A detergent composition according to claim 8 wherein the foam control agent is present in an amount of from 0.02 to 25% by weight based on the total detergent composition.

10. A method of controlling the foam of an aqueous surfactant solution in an environment with free surface turbulence which comprises mixing said solution with 5×10⁻⁴ to 10% by weight of the surfactant solution of a foam control agent comprising (A) from 70 to 99.9 parts by weight of an organopolysiloxane of which the siloxane units consist essentially for 0 to 60% of units of the general formula (i)

$$R_a SiO_{\frac{4-a}{2}}$$

wherein R denotes a hydrocarbon group having up to 8 carbon atoms and a has a value of from 0 to 3, and for 40 to 100% of units of the general formula (ii)

$$R_b R_c" SiO_{\frac{4-b-c}{2}}$$

wherein R is as defined above, R" denotes a group —$Z_z$—R' wherein R' denotes an alkyl group having from 9 to 35 carbon atoms, Z denotes a linking group between silicon and R' and z has a value of 0 or 1, b has a value of 0, 1, or 2, c has a value of 1 or 2, and b+c has a value of 1, 2, or 3, provided more than 70% by weight of the carbon content of the organopolysiloxane is due to the groups R"; and (B) from 0.1 to 30 parts by weight of a finely divided hydrophobic particulate material.

11. A method according to claim 10 wherein the organopolysiloxanes are polydiorganosiloxanes with the general structure $$R_c°R_b Si—O—[RR"Si—O]_x—[R_2 Si—O]_y—SiR_b R_c°$$

wherein R and R" are as defined above, R° is selected from the group R and the group R" b and c are as defined above, and x and y each independently denote an integer.

12. A method according to claim 11 wherein the total chain length (x+y+2) includes from 40 to 500 units.

13. A method according to claim 10 wherein R' groups have a carbon chain of from 10 to 24 atoms.

14. A method according to claim 10 wherein Component (B) is hydrophobic silica, having an average particle size of from 0.1 to 50µ and a surface of at least 50m²/g.

15. A method according to claim 10, wherein the foam control agent further comprises (C) from greater than zero to 20 parts by weight of an organosilicon resin consisting essentially of triorganosiloxane groups and SiO$_{4/2}$ groups.

16. A method according to claim 15 wherein Component (C) is present in an amount of from 5 to 10 parts by weight.

17. A method according to claim 10, the method further comprising emulsifying the foam control agent with surfactants and water prior to mixing the foam control agent with the aqueous surfactant solution.

18. A method according to claim 10, the method further comprising dispersing the foam control agent with dispersing agents and water prior to mixing the foam control agent with the aqueous surfactant solution.

19. An emulsion comprising a foam control agent according to claim 1, surfactants, and water.

20. A dispersion comprising a foam control agent according to claim 1, dispersing agents, and water.

\* \* \* \* \*